US008942617B2

(12) United States Patent
Matsuda et al.

(10) Patent No.: US 8,942,617 B2
(45) Date of Patent: Jan. 27, 2015

(54) DRIVE TRANSMISSION UNIT AND IMAGE FORMING APPARATUS INCLUDING SAME

(71) Applicants: Naoki Matsuda, Kanagawa (JP); Masahiro Ishida, Kanagawa (JP)

(72) Inventors: Naoki Matsuda, Kanagawa (JP); Masahiro Ishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/187,476

(22) Filed: Feb. 24, 2014

(65) Prior Publication Data

US 2014/0251047 A1    Sep. 11, 2014

(30) Foreign Application Priority Data

Mar. 11, 2013    (JP) .................................. 2013-047751

(51) Int. Cl.
G03B 15/00    (2006.01)
F16H 1/02    (2006.01)

(52) U.S. Cl.
CPC ........................................ *F16H 1/02* (2013.01)
USPC ........................................................ 399/401

(58) Field of Classification Search
CPC .................................................... F16H 1/02
USPC ........................................................ 399/401
See application file for complete search history.

(56) References Cited

U.S. PATENT DOCUMENTS

| 8,351,827 | B2 * | 1/2013 | Yoshii | 399/254 |
| 8,556,256 | B2 * | 10/2013 | Ito | 271/186 |
| 8,646,776 | B2 * | 2/2014 | Agata et al. | 271/270 |
| 2005/0238398 | A1 * | 10/2005 | Aono | 399/388 |
| 2008/0279601 | A1 * | 11/2008 | Sahara et al. | 399/401 |
| 2010/0061743 | A1 * | 3/2010 | Uematsu | 399/38 |
| 2012/0251177 | A1 * | 10/2012 | Tomatsu | 399/167 |

FOREIGN PATENT DOCUMENTS

| JP | 2008-216968 | 9/2008 |
| JP | 2010-023983 | 2/2010 |

* cited by examiner

*Primary Examiner* — Rodney Fuller
(74) *Attorney, Agent, or Firm* — Harness, Dickey & Pierce, P.L.C.

(57) ABSTRACT

A drive transmission unit includes a rotation input shaft to bear rotatably and coaxially a first input rotary body that rotates in a first direction and a second input rotary body, and a rotation output shaft to bear rotatably and coaxially a first output rotary body disposed in a radial direction of the first input rotary body and a second output rotary body disposed in the radial direction of the second input rotary body. A first switching device is disposed on the rotation input shaft and switches between a power transmitting state and a non-transmitting state between the first input rotary body and the second input rotary body. A second switching device is disposed on the rotation output shaft and switches between the power transmitting state and the non-transmitting state between the first output rotary body and the second output rotary body.

7 Claims, 4 Drawing Sheets ial direction.
DRIVE TRANSMISSION UNIT AND IMAGE FORMING APPARATUS INCLUDING SAME

CROSS-REFERENCE TO RELATED APPLICATIONS

This patent application is based on and claims priority pursuant to 35 U.S.C. §119 to Japanese Patent Application No. 2013-047751, filed on Mar. 11, 2013, in the Japan Patent Office, the entire disclosure of which is hereby incorporated by reference herein.

BACKGROUND

1. Technical Field

Exemplary aspects of the present invention generally relate to a drive transmission unit and an image forming apparatus including the drive transmission unit, and more particularly to a drive transmission unit that switches a direction of rotation of a gear.

2. Description of the Related Art

There is known a drive transmission unit that inputs an output rotation of a motor to an output shaft and transmits the rotation of the motor to a target by rotating the output shaft in a forward and a reverse rotation. Such a configuration is proposed in JP-2010-023983-A, for example. The known drive transmission unit includes two drive transmission paths from a drive-input gear meshing with a gear to which rotation is input from the motor, to a drive-output gear that transmits the rotation to the target. The first path is a path from the drive-input gear to the drive-output gear via a forward-rotation clutch which is engaged upon outputting the forward rotation and is disengaged upon outputting the reverse rotation. The second path is a path from the drive-input gear to the drive-output gear via a counter gear and via a reverse-rotation clutch which is engaged upon outputting the forward rotation and is disengaged upon outputting the reverse rotation.

As described above, the number of intervening gears is different between the first path and the second path, thereby transmitting selectively the forward rotation and the reverse rotation of the drive-output gear while rotating a single motor in a single direction.

The known drive transmission unit includes the plurality of gears. That is, the known drive transmission unit includes the counter gear and the input gears for the clutches, arranged together in the radial direction of the drive-input gear. The output gears for both clutches are disposed in the radial direction. Furthermore, the drive-output gear is also disposed in the radial direction of the output gears.

A drawback to this configuration is that two gear systems having the plurality of gears are disposed from the drive-input gear in the radial direction of the rotary shaft of the drive-input gear, which occupies a significant space in the radial direction.

In view of the above, there is demand for a drive transmission unit that occupies less space in the radial direction of a rotary shaft, and an image forming apparatus including such a drive transmission unit.

SUMMARY

In view of the foregoing, in an aspect of this disclosure, there is provided an improved drive transmission unit including a first input rotary body, a second input rotary body, an rotation input shaft, a first switching device, a first output rotary body, a second output rotary body, an rotation output shaft, and a second switching device. The first input rotary body rotates in a first direction. The rotation input shaft holds rotatably and coaxially the first input rotary body and the second input rotary body. The first switching device is disposed on the rotation input shaft to switch between a power transmitting state and a non-transmitting state between the first input rotary body and the second input rotary body. The first output rotary body is disposed in a radial direction of the first input rotary body to receive from the first input rotary body a driving force in a second direction opposite the first direction. The second output rotary body is disposed in the radial direction of the second input rotary body to receive from the second input rotary body a driving force in the same direction of rotation as that of the second input rotary body. The rotation output shaft holds rotatably and coaxially the first output rotary body and the second output rotary body. The second switching device is disposed on the rotation output shaft to switch between the power transmitting state and the non-transmitting state between the first output rotary body and the second output rotary body.

According to another aspect, an image forming apparatus includes the drive transmission unit.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION

Figure 1:
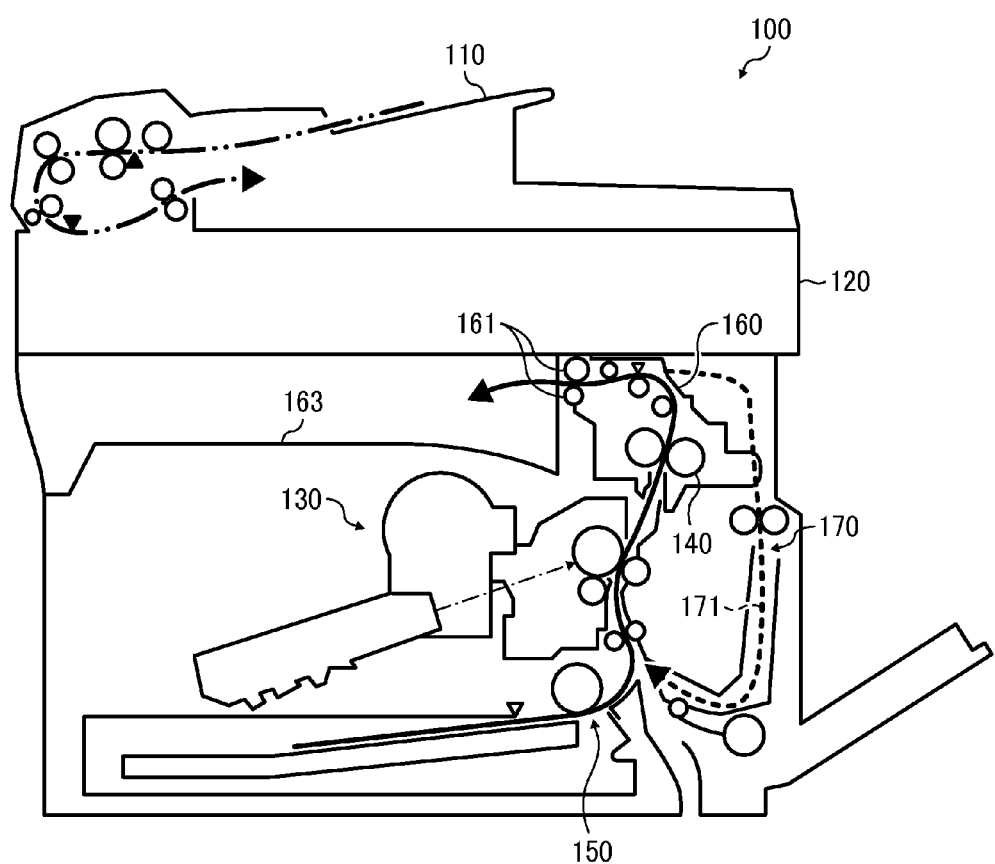
FIG. 1 is a schematic diagram illustrating an image forming apparatus including a drive transmission unit according to a first illustrative embodiment of the present disclosure.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, exemplary embodiments of the present patent application are described.

With reference to FIG. 1, a description is provided of an image forming apparatus according to an illustrative embodiment of the present disclosure. FIG. 1 is a schematic diagram illustrating an image forming apparatus 100 equipped with a drive transmission unit A according to a first illustrative embodiment of the present disclosure.

As illustrated in FIG. 1, the image forming apparatus 100 includes an automatic document feeder 110, a reading device 120, an image forming device 130, a fixing device 140, a sheet feeder 150, a sheet output device 160, a switchback device 170, and so forth.

The automatic document feeder 110 includes a document feeding mechanism which reads a document passing therethrough. The reading device 120 employs a known reading device that reads the document while transporting the document delivered to a reading position by the automatic document feeder 110.

The image forming device 130 employs a known image forming configuration equipped with a photosensitive member, a charger, an optical writing device, a developing device, a transfer device, a cleaning device, a charge remover, and so forth. In the image forming device 130, the photosensitive member is charged by the charger, and a latent image is formed on the surface of the photosensitive member by the optical writing device. The latent image is developed with toner by the developing device, thereby forming a visible image known as a toner image. Subsequently, the toner image is transferred onto a recording medium by the transfer device. Residual toner remaining on the surface of the photosensitive member after transfer process is removed by the cleaning device, and a residual potential remaining on the surface of the photosensitive member is removed by the charge remover in preparation for the subsequent imaging cycle, thereby obtaining zero potential.

The fixing device 140 includes a heating roller and a pressing roller pressing against the heating roller. The sheet feeder 150 feeds a sheet of recording medium from a stack of recording media in a sheet cassette, one sheet at a time, to the transfer device side in the image forming device 130. The sheet output device 160 outputs the recording medium delivered from the fixing device 140 onto a sheet tray 163 and can switchback the recording medium to the switchback device 170. More specifically, the sheet output device 160 includes a pair of sheet output rollers 161 that rotates in a reverse direction when a sheet detector detects that the leading end of the recording medium is interposed between the pair of output rollers 161, thereby feeding the recording medium to the switchback device 170.

The switchback device 170 includes a switchback path 171 indicated by a broken line in FIG. 1. The recording medium bearing an image on one side thereof by the image forming device 130 and interposed between the pair of sheet output rollers 161 is turned over via the switchback path 171 and fed to the image forming device 130 so that an image is transferred onto the other side or the second side of the recording medium. It is to be noted that the pair of sheet output rollers 161 is rotated in the opposite direction relative to a rotation input by meshing with an external gear, for example.

The drive transmission unit A according to the first illustrative embodiment is employed for forward and reverse rotation of the pair of sheet output rollers 161 of the sheet output device 160 in the image forming apparatus 100. With reference to FIGS. 2A through 3B, a description is provided of the drive transmission unit A according to the first illustrative embodiment of the present disclosure. As illustrated in FIGS. 2A through 3B, the drive transmission unit A includes a rotation input shaft 1 and a rotation output shaft 2. The rotation input shaft 1 receives a rotary input from a motor. The rotation output shaft 2 outputs a rotary output to the pair of sheet output rollers 161.

The rotation input shaft 1 includes a first input rotary body 11 and a second input rotary body 12, both of which are coaxially disposed on the rotation input shaft 1. The axial direction of the first input rotary body 11 and the second input rotary body 12 is parallel to a rotation center shaft 31 of a drive gear 3 which receives the rotary input from the motor serving as a drive source.

The first input rotary body 11 is rotatably connected to the rotation input shaft 1 and includes an external gear 11a. The external gear 11a is formed on an outer peripheral surface of the first input rotary body 11 and meshes with the drive gear 3. The second input rotary body 12 is a pulley that transmits a driving force to a belt 4 using friction. The second input rotary body 12 is disposed on the rotation input shaft 1 via an input clutch 5. In this configuration, the second input rotary body 12 rotates integrally with the rotation input shaft 1 while the input clutch 5 is engaged. The second input rotary body 12 rotates idle on the rotation input shaft 1 when the input clutch 5 is disengaged.

In other words, the input clutch 5 is disposed on the rotation input shaft 1 to serve as a switching device at the drive-input side to change between a power transmitting state and a non-transmitting state between the first input rotary body 11 and the second input rotary body 12.

The rotation output shaft 2 is disposed parallel to the rotation input shaft 1 at a position in the radial direction of the rotation input shaft 1. The rotation of the rotation output shaft 2 is transmitted to the sheet output rollers 161.

A first output rotary body 21 and a second output rotary body 22 are coaxially disposed on the rotation output shaft 2. The first output rotary body 21 includes an external gear 21a formed on the outer peripheral surface thereof and meshes with the external gear 11a of the first input rotary body 11. The first output rotary body 21 is disposed on the rotation output shaft 2 via an output clutch 6. In this configuration, the first output rotary body 21 rotates integrally with the rotation output shaft 2 while the output clutch 6 is engaged. When the output clutch 6 is disengaged, the first output rotary body 21 rotates idle relative to the rotation output shaft 2.

In other words, the output clutch 6 is disposed on the rotation output shaft 2 to serve as a switching device at the drive-output side to change between the power transmitting state and the non-transmitting state between the first output rotary body 21 and the second output rotary body 22.

The second output rotary body 22 is a pulley that transmits a driving force to the belt 4 using friction. The second output rotary body 22 is disposed at the same height as the second input rotary body 12 and is rotatably and integrally disposed on the rotation output shaft 2 via the belt 4. It is to be noted that a plurality of gear teeth may be formed on an inner surface of the belt loop of the belt 4 and the outer peripheral surface of the rotary bodies 12 and 22.

First Embodiment

When outputting the forward rotation in which the rotation output shaft 2 is rotated in the same direction as that of the drive gear 3 to which rotation of the motor is transmitted, the input clutch 5 is disengaged (OFF), and the output clutch 6 is engaged (ON).

Figure 2A:
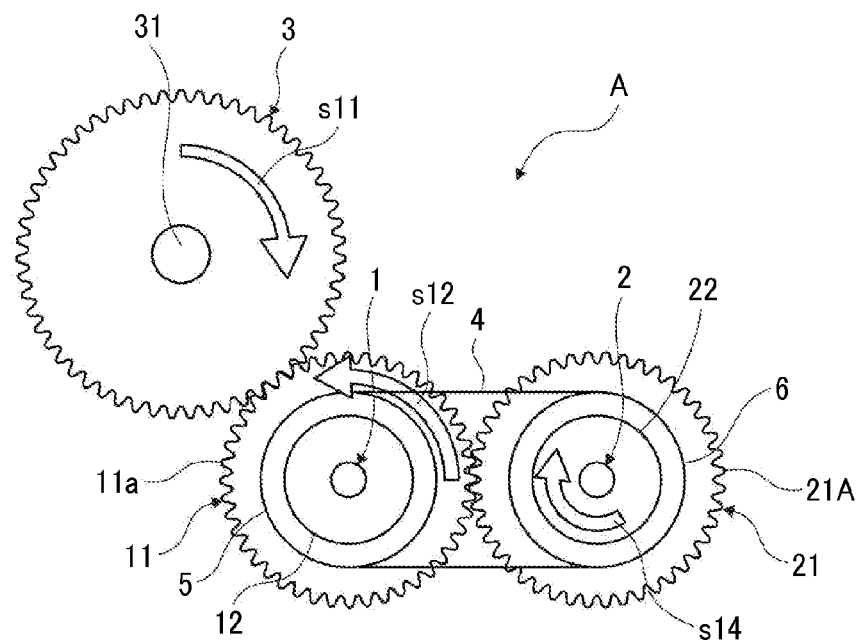
FIG. 2A is a schematic diagram illustrating the drive transmission unit employed in the image forming apparatus of FIG. 1 in a power transmitting state upon outputting forward rotation as viewed along a rotary shaft.
Figure 2B:
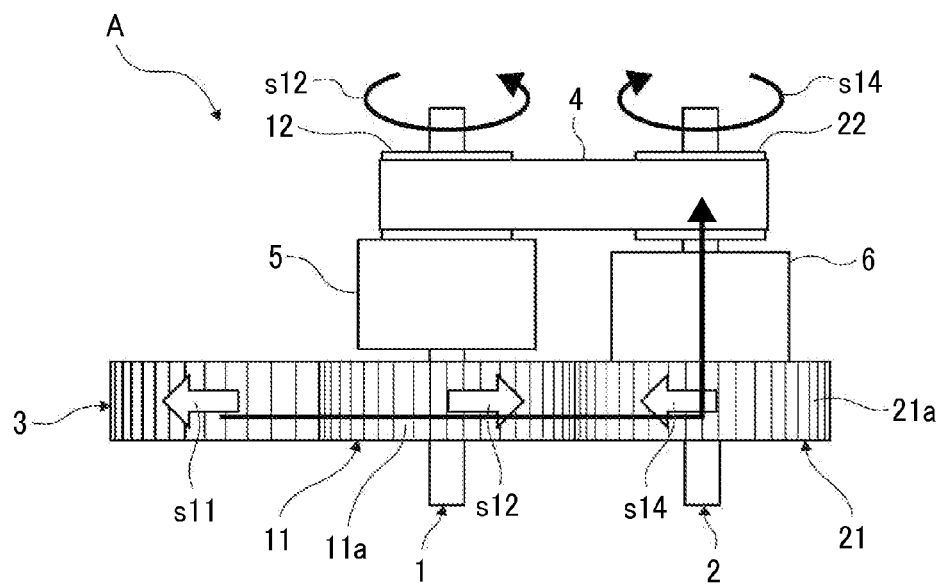
FIG. 2B is a schematic diagram illustrating the drive transmission unit in the power transmitting state upon outputting forward rotation as viewed from a diameter direction of the rotary shaft.

FIGS. 2A and 2B illustrate the transmission of driving force when outputting the forward rotation. The rotation of the drive gear 3 in the direction indicated by an arrow sill is transmitted to the first input rotary body 11, and the rotation input shaft 1 rotates in the opposite direction indicated by an arrow s12. At this time, the input clutch 5 is disengaged so that the second input rotary body 12 rotates idle relative to the rotation input shaft 1.

With respect to the rotation output shaft 2, the rotation of the first input rotary body 11 is transmitted to the first output rotary body 21, thereby rotating the first output rotary body 21 forward in the direction of arrow s14. Furthermore, the rotation of the first output rotary body 21 is transmitted to the rotation output shaft 2 via the output clutch 6, thereby rotating the rotation output shaft 2 in the direction of arrow s14.

Accordingly, the sheet output rollers 161 (shown in FIG. 1) connected to the rotation output shaft 2 rotates forward. At this time, the second output rotary body 22 rotates integrally with the rotation output shaft 2 and its rotation is transmitted to the second input rotary body 12 via the belt 4. At this time, because the second input rotary body 12 is disengaged from the rotation input shaft 1 by the input clutch 5 as described above, the second input rotary body 12 rotates idle in the direction opposite the direction of rotation of the rotation input shaft 1 rotating in the direction of arrow s12.

Figure 3A:
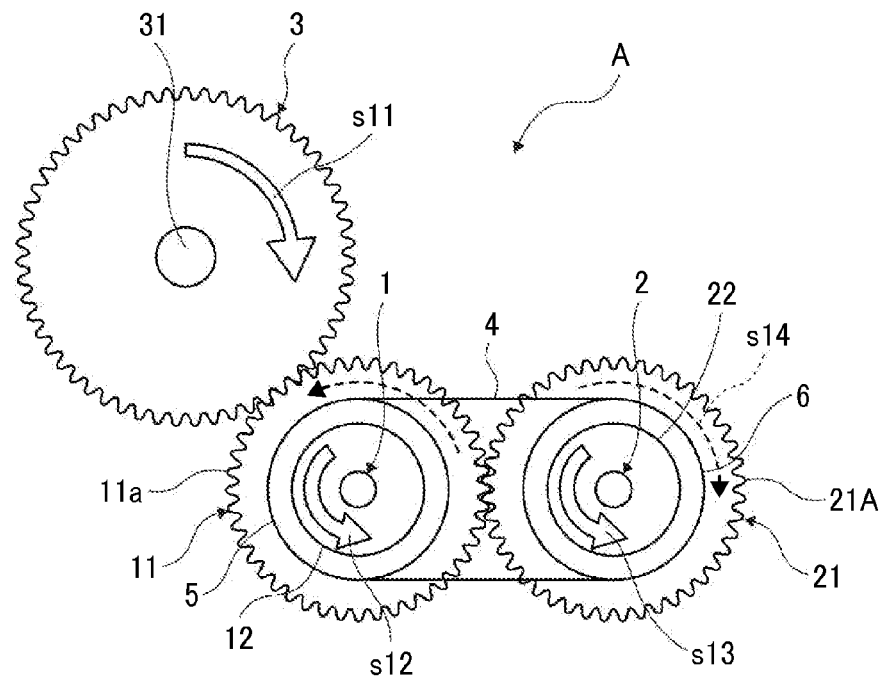
FIG. 3A is a schematic diagram illustrating the drive transmission unit in the power transmitting state upon outputting reverse rotation as viewed along the rotary shaft.
Figure 3B:
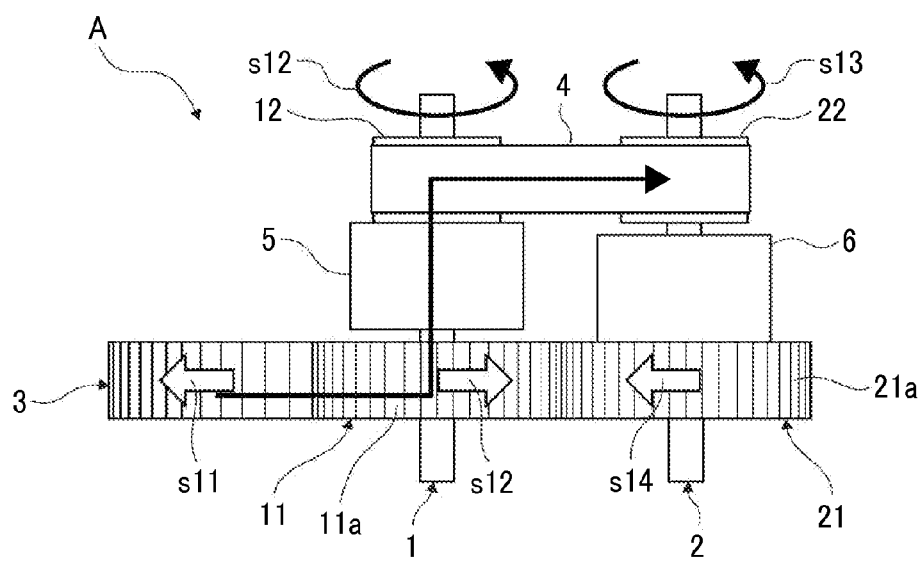
FIG. 3B is a schematic diagram illustrating the drive transmission unit in the power transmitting state upon outputting reverse rotation as viewed from the diameter direction of the rotary shaft.

When outputting reverse rotation in which the rotation output shaft 2 is rotated in the opposite direction to the direction of rotation of the drive gear 3 to which rotation of the motor is transmitted, the input clutch 5 is engaged (ON), and the output clutch 6 is disengaged (OFF). FIGS. 3A and 3B illustrate the transmission of driving force when outputting the reverse rotation. Similar to when outputting the forward rotation, the rotation of the drive gear 3 in the direction of arrow s11 is transmitted to the first input rotary body 11, and the rotation input shaft 1 rotates in the reverse direction indicated by the arrow s12. At this time, when outputting the reverse rotation, the input clutch 5 is engaged so that the second input rotary body 12 rotates integrally with the rotation input shaft 1 in the direction of arrow s12.

Furthermore, the rotation of the second input rotary body 12 is transmitted to the second output rotary body 22 via the belt 4, and the second output rotary body 22 and the rotation output shaft 2 rotate in the reverse direction in indicated by an arrow s13, that is, in the direction opposite the direction of rotation (s11) of the drive gear 3. Accordingly, the sheet output rollers 161 connected to the rotation output shaft 2 rotate in the reverse direction. With respect to the rotation output shaft 2, the rotation of the first input rotary body 11 is transmitted to the first output rotary body 21, thereby rotating the first output rotary body 21 forward in the direction of arrow s14. At this time, however, the output clutch 6 is disengaged so that the first output rotary body 21 rotates idle relative to the rotation output shaft 2.

Effects of the First Embodiment

Effect A

According to the first illustrative embodiment of the present disclosure, the drive transmission unit A includes the first input rotary body 11, the second input rotary body 12, the rotation input shaft 1, the first output rotary body 21, the second output rotary body 22, the rotation output shaft 2, the input clutch 5, and the output clutch 6. The first input rotary body 11 and the second input rotary body 12 are disposed coaxially on the rotation input shaft 1. The first input rotary body 11 rotates in a first direction. The first output rotary body 21 is disposed in the radial direction of the first input rotary body 11 and is driven to rotate in a second direction opposite the first direction. The second output rotary body 22 is disposed in the radial direction of the second input rotary body 12 and is driven to rotate in the same direction as that of the second input rotary body 12. The first output rotary body 21 and the second output rotary body 22 are disposed coaxially on the rotation output shaft 2. The rotation input shaft 1 includes the input clutch 5 disposed between the rotation input shaft 1 and the second input rotary body 12. The input clutch 5 serves as a switching device that switches between the power transmitting state and the non-transmitting state between the first input rotary body 11 and the second input rotary body 12. The rotation output shaft 2 includes the output clutch 6 disposed between the rotation output shaft 2 and the first output rotary body 21. The output clutch 6 serves as a switching device to change between the power transmitting state and the non-transmitting state between the first output rotary body 21 and the second output rotary body 22.

With this configuration, the rotation input shaft 1 on which input rotary bodies 11 and 12 are coaxially disposed and the rotation output shaft 2 on which the output rotary bodies 21 and 22 are coaxially disposed are arranged in the radial direction without a gear or the like including a rotary shaft between the rotation input shaft 1 and the rotation output shaft 2 to transmit a driving force.

This configuration reduces the space in the radial direction as compared with a configuration having a drive transmission device including a rotary shaft in addition to the rotation input shaft 1 and the rotation output shaft 2 in the radial direction, thereby providing more freedom in allocation of the drive transmission device in the image forming apparatus 100.

Effect B

According to the first illustrative embodiment of the present disclosure, the drive transmission unit A includes the sheet output rollers 161 as a rotation target to which a driving force is transmitted from the rotation output shaft 2. The output clutch 6 switches between the power transmitting state and the non-transmitting state between the first output rotary body 21 and the rotation output shaft 2.

In this configuration, when the input clutch 5 is in the non-transmitting state (disengaged) and the output clutch 6 is in the power transmitting state (engaged), the rotation output shaft 2 is rotated in the direction opposite the direction of rotation of the rotation input shaft 1. When the input clutch 5 is in the power transmitting state (engaged) and the output clutch 6 is in the non-transmitting state (disengaged), the rotation output shaft 2 is rotated in the same direction as the direction of rotation of the rotation input shaft 1.

With this configuration, by changing the rotation direction of the rotation output shaft 2, the driving force (rotation) can be transmitted to the rotation target, i.e., the sheet output rollers 161.

Effect C

According to the first illustrative embodiment of the present disclosure, the drive transmission unit A includes a first drive transmitter and a second drive transmitter. The first drive transmitter transmits a driving force between the first input rotary body 11 and the first output rotary body 21. The first drive transmitter includes the external gear 11a formed on the outer peripheral surface of the first input rotary body 11 and the external gear 21a formed on the outer peripheral surface of the first output rotary body 21 meshing alternately with the external gear 11a of the first input rotary body 11. The second drive transmitter transmits the driving force between the second input rotary body 12 and the second output rotary body 22. The second drive transmitter includes the belt 4 wound around the second input rotary body 12 and the second output rotary body 22.

Therefore, in the transmission of the driving force via the first input rotary body 11 and the first output rotary body 21, the rotation of the rotation input shaft 1 is transmitted to the rotation output shaft 2 as a rotation in the opposite direction. By contrast, in the transmission of the driving force via the second input rotary body 12 and the second output rotary body 22, the rotation of the rotation input shaft 1 is transmitted to the rotation output shaft 2 as a rotation in the same direction.

With this configuration, the direction of rotation of the rotation input shaft 1 and the direction of rotation of the rotation output shaft 2 can be reversed between when using the first input rotary body 11 and the first output rotary body 21 and when using the second input rotary body 12 and the second output rotary body 22. Using the belt 4 makes less noise in a high-speed rotation range, as compared with transmission of force via a plurality of gears.

Effect D

According to the present illustrative embodiment of the present disclosure, the rotation output shaft 2 of the drive transmission unit A is disposed such that the rotation output shaft 2 can transmit a driving force to the sheet output rollers 161 of the image forming apparatus 100. With this configuration, the direction of rotation of the sheet output rollers 161 can be changed between the forward and reverse directions without changing the direction of rotation of the motor, and the space in the radial direction of the drive transmission unit A can be reduced.

Second Embodiment

Figure 4:
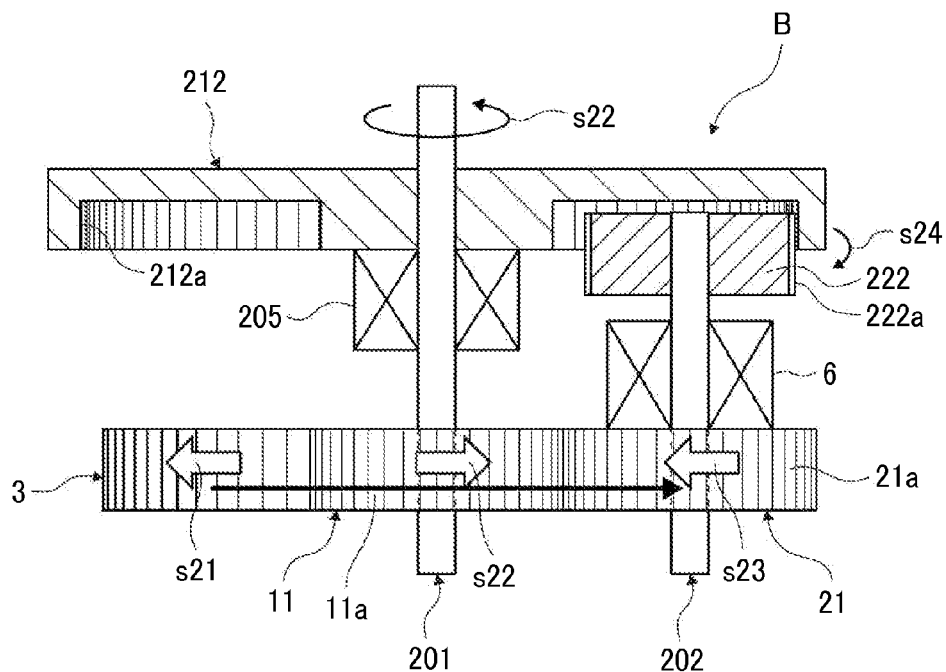
FIG. 4 is a cross-sectional view schematically illustrating the drive transmission unit in the power transmitting state upon outputting forward rotation as viewed from the radial direction of the rotary shaft according to a second illustrative embodiment of the present disclosure.
Figure 5:
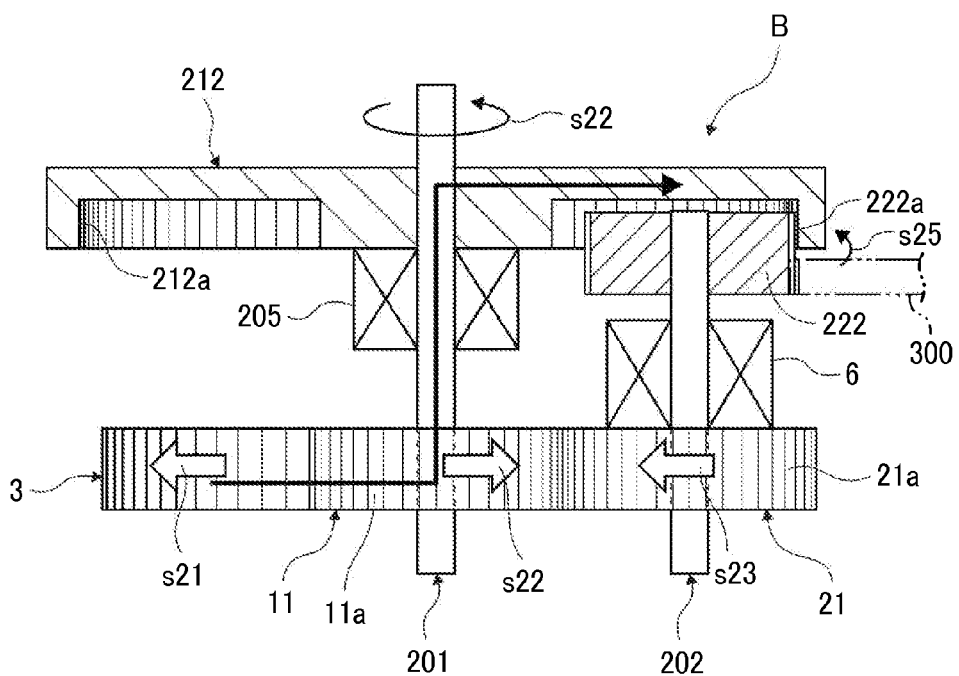
FIG. 5 is a cross-sectional view schematically illustrating the drive transmission unit in the power transmitting state upon outputting reverse rotation as viewed from the radial direction of the rotary shaft according to the second illustrative embodiment of the present disclosure.

With reference to FIGS. 4 and 5, a description is provided of a drive transmission unit B according to a second illustrative embodiment of the present disclosure.

It is to be noted that the drive transmission unit B is a variation of the drive transmission A of the first illustrative embodiment. Thus, the same reference numerals used in the first illustrative embodiment will be given to constituent elements such as parts and materials having the same functions, and the descriptions thereof will be omitted.

As illustrated in FIGS. 4 and 5, the drive transmission unit B includes a second input rotary body 212. The second input rotary body 212 includes an internal gear 212a formed on the inner surface of the rim of the second input rotary body 212. Using an input clutch 205, the second input rotary body 212 is rotated integrally with a rotation input shaft 201 in the power transmitting state (engaged) and is rotated idle relative to the rotation input shaft 201 in the non-transmitting state (disengaged).

The drive transmission unit B includes a second output rotary body 222. The second output rotary body 222 disposed on a rotation output shaft 202 includes an external gear 222a formed on the outer peripheral surface of the second output rotary body 222. The external gear 222a meshes with the internal gear 212a.

According to the present illustrative embodiment, upon output of forward rotation in which the rotation output shaft 202 is rotated in the same direction as the drive gear 3 to which rotation of the motor is transmitted, an input clutch 205 is disengaged (OFF), and the output clutch 6 is engaged (ON).

FIG. 4 illustrates the transmission of driving force when outputting the forward rotation. The rotation of the drive gear 3 in the direction indicated by an arrow s21 is transmitted to the first input rotary body 11, and the rotation input shaft 201 rotates in the reverse direction indicated by an arrow s22. At this time, the input clutch 205 is disengaged so that the second input rotary body 212 rotates idle relative to the rotation input shaft 201.

With respect to the rotation output shaft 202, the rotation of the first input rotary body 11 is transmitted to the first output rotary body 21, thereby rotating the first output rotary body 21 forward in the direction of arrow s23. Furthermore, the rotation of the first output rotary body 21 is transmitted to the rotation output shaft 202 via the output clutch 6, thereby rotating the rotation output shaft 202 forward as well.

Accordingly, the sheet output rollers 161 (shown in FIG. 1) connected to the rotation output shaft 202 rotate forward. At this time, the second output rotary body 222 rotates integrally with the rotation output shaft 202 and its rotation is transmitted to the second input rotary body 212 via the gears 222a and 212a. At this time, because the second input rotary body 212 is disengaged from the rotation input shaft 201 by the input clutch 205 as described above, the second input rotary body 212 rotates idle in the direction of arrow s24 relative to the rotation input shaft 201.

When outputting the reverse rotation in which the rotation output shaft 202 is rotated in the opposite direction to the direction of rotation of the drive gear 3 to which rotation of the motor is transmitted, the input clutch 205 is engaged (ON), and the output clutch 6 is disengaged (OFF).

FIG. 5 illustrates the transmission of driving force upon output of the reverse rotation. Similar to the forward rotation, the rotation of the drive gear 3 in the direction indicated by an arrow s21 is transmitted to the first input rotary body 11, and the rotation input shaft 201 rotates in the reverse direction indicated by an arrow s22.

At this time, upon output of the reverse rotation, the input clutch 205 is engaged so that the second input rotary body 212 rotates integrally with the rotation input shaft 201 in the direction of arrow s22.

Furthermore, the rotation of the second input rotary body 212 is transmitted to the second output rotary body 222 via the gears 212a and 222a, and the second output rotary body 222 and the rotation output shaft 202 rotate in the reverse direction indicated by an arrow s25, that is, in the direction opposite the direction of rotation (s21) of the drive gear 3. Accordingly, the sheet output rollers 161 connected to the rotation output shaft 202 rotate in the reverse direction.

With respect to the rotation output shaft 202, the rotation of the first input rotary body 11 is transmitted to the first output rotary body 21, thereby rotating the first output rotary body 21 forward in the direction of arrow s23. At this time, however, the output clutch 6 is disengaged so that the first output rotary body 21 rotates idle relative to the rotation output shaft 202.

According to the present illustrative embodiment, the same or the similar effects as Effect A and B of the first illustrative embodiment described above can be achieved.

Furthermore, the internal gear 212a of the second input rotary body 212 and the external gear 222a of the second output rotary body 222 meshing alternately with the internal gear 212a in the drive transmission unit B of the second illustrative embodiment constitute a drive transmitter that transmits a driving force to the second input rotary body 212 and the second output rotary body 222. With this configuration, the rotation of the rotation input shaft 201 can be transmitted to the rotation output shaft 202 as the rotation in the same direction via the second input rotary body 212 and the second output rotary body 222.

Furthermore, because the second input rotary body 212 is an internal gear, it produces less noise and less vibration as compared with an external gear meshing with another external gear.

As a variation of the second illustrative embodiment, as illustrated in FIG. 5, the second output rotary body 222 may mesh with an output gear 300. The output gear 300 may be disposed as a driven rotary body coaxially disposed on the same shaft as the sheet output rollers 161 and the like. Accordingly, a variation in the structure of the output side from the rotation output shaft 2 provides freedom in designing of the apparatus.

It is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

For example, according to the illustrative embodiments described above, the drive transmission unit is employed to transmit a driving force from the motor to the sheet output rollers in the image forming apparatus. The drive transmission unit is not limited thereto.

Alternatively, the drive transmission unit may be employed to rotate an image bearing member that forms a toner image in the developing unit in the image forming device of the image forming apparatus. Similarly, the drive transmission unit may be employed to rotate an intermediate transfer belt in the transfer device, the photosensitive member in the image forming device, and a roller in the fixing device of the image forming apparatus.

According to the illustrative embodiments described above, the input switching device, i.e., the input clutch, is disposed between the rotation input shaft and the second input rotary body. The position of the input switching device is not limited thereto as long as the input switching device can change between the power transmitting state and the non-transmitting state between the first input rotary body and the second input rotary body. For example, the input switching device may be disposed in the middle of the rotation input shaft so as to change between the power transmitting state and the non-transmitting state between the first input rotary body and the second input rotary body on the rotation input shaft. Alternatively, the input switching device may be disposed between the first input rotary body and the rotation input shaft.

More specifically, in the former case, the rotation input shaft 1 of the first illustrative embodiment may be constituted of a first shaft and a second shaft. The first shaft is provided to the input rotary body 11 and the second shaft is provided to the second input rotary body 12, and the first shaft and the second shaft are arranged serially in the axial direction. The input switching device such as the input clutch 5 switches between the power transmitting state and the non-transmitting state between the first shaft and the second shaft. In the latter case, with reference to the configuration of the first illustrative embodiment, the input switching device such as the input clutch 5 is disposed between the rotation input shaft 1 and the first input rotary body 11, and switches between the power transmitting state and the non-transmitting state between the rotation input shaft 1 and the first input rotary body 11.

According to the illustrative embodiments described above, the output switching device is disposed between the rotation output shaft and the second output rotary body. The position of the output switching device is not limited thereto as long as the output switching device can switch between the power transmitting state and the non-transmitting state between the first output rotary body and the second output rotary body. For example, the output switching device may be disposed in the middle of the rotation output shaft so as to switch between the power transmitting state and the non-transmitting state between the first output rotary body and the second output rotary body on the rotation output shaft side.

More specifically, the rotation output shaft 2 shown in the first illustrative embodiment may be constituted of a first shaft and a second shaft. The first shaft is provided to the first output rotary body 21, and the second shaft is provided to the second output rotary body 22. The first shaft and the second shaft are arranged serially in the axial direction. The output switching device such as the output clutch 6 switches between the power transmitting state and the non-transmitting state between the first shaft and the second shaft.

Alternatively, the output switching device may be disposed between the second output rotary body and the rotation output shaft. In this case, the rotation output shaft is rotated always in the same direction as that of the first output rotary body, and the second output rotary body outputs the output from the rotation output shaft.

With reference to the configuration of the first illustrative embodiment, the output switching device such as the output clutch 6 is disposed between the rotation output shaft 2 and the second output rotary body 22. In this case, the rotation output shaft 2 is rotated in one direction. Thus, the second output rotary body 22 outputs the output of the rotation output shaft 2 as described in the variation of the second illustrative embodiment. As described in the second illustrative embodiment, the rotation is output by using the output gear 300, a belt, a chain, and any other suitable material.

Furthermore, the rotation transmitter of the first input rotary body and the first output rotary body, and the rotation transmitter of the second input rotary body and the second output rotary body are not limited to the ones shown in the illustrative embodiments described above. The rotation of the first input rotary body and the first output rotary body may be transmitted using a belt and any other suitable material. In this case, upon reverse rotation, the belt is crossed at the center of the first input rotary body and the first output rotary body, and is wound around each of the rotary bodies. As a rotary transmitter for the second input rotary body and the second output rotary body, an external gear may be used. In this case, in order to rotate both rotary bodies, the external gear is disposed between the rotary bodies.

According to the illustrative embodiments described above, the rotation output shaft at the output side receives a driving force only from the rotation input shaft. The input switching device, i.e., the input clutch 5, and the output switching device, i.e., the output clutch 6, are disposed in a space in the axial direction on the respective input and output shafts. With this configuration, the number of meshing gears in the radial direction can be reduced, thereby occupying less space in the radial direction, as compared with a configuration in which the direction of rotation of drive transmission is changed by changing the number of gears disposed in the radial direction.

According to an aspect of this disclosure, the present invention is employed in the image forming apparatus. The image forming apparatus includes, but is not limited to, an electrophotographic image forming apparatus, a copier, a printer, a facsimile machine, and a digital multi-functional system.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A drive transmission unit, comprising:
   a first input rotary body to rotate in a first direction;
   a second input rotary body;
   a rotation input shaft to bear rotatably and coaxially the first input rotary body and the second input rotary body,
   a first switching device disposed on the rotation input shaft to switch between a power transmitting state and a non-transmitting state between the first input rotary body and the second input rotary body;
   a first output rotary body disposed in a radial direction of the first input rotary body, to receive from the first input rotary body a driving force in a second direction opposite the first direction;
   a second output rotary body disposed in the radial direction of the second input rotary body, to receive from the second input rotary body a driving force in the same direction of rotation as that of the second input rotary body;
   a rotation output shaft to bear rotatably and coaxially the first output rotary body and the second output rotary body, and
   a second switching device disposed on the rotation output shaft to switch between the power transmitting state and the non-transmitting state between the first output rotary body and the second output rotary body.

2. The drive transmission unit according to claim 1, further comprising a first drive target driven by the second output rotary body.

3. The drive transmission unit according to claim 1, further comprising a second drive target driven by the rotation output shaft,
   wherein the second switching device switches between the power transmitting state and the non-transmitting state between the first output rotary body and the rotation output shaft.

4. The drive transmission unit according to claim 1, further comprising:
   a first drive transmitter to transmit the driving force between the first input rotary body and the first output rotary body, the first drive transmitter including an external gear formed on an outer peripheral surface of the first input rotary body and an external gear formed on an outer peripheral surface of the first output rotary body to mesh alternately with the external gear of the first input rotary body; and
   a second drive transmitter to transmit the driving force between the second input rotary body and the second output rotary body, the second drive transmitter including a belt wound around the second input rotary body and the second output rotary body.

5. The drive transmission unit according to claim 1, further comprising a drive transmitter to transmit the driving force between the second input rotary body and the second output rotary body,
   wherein the drive transmitter includes an internal gear formed on an inner surface of a rim of the second input rotary body and an outer gear formed on an outer peripheral surface of the second output rotary body to mesh alternately with the internal gear.

6. The drive transmission unit according to claim 1, wherein the first switching device and the second switching device comprise clutches.

7. An image forming apparatus, comprising the drive transmission unit according to claim 1.

* * * * *